March 7, 1967    J. W. ADAM ETAL    3,307,861
COUPLING WITH A DEFORMABLE SEAL
Filed March 2, 1964    2 Sheets-Sheet 1

JAMES W. ADAM
BERNARD GOOBICH
THOMAS M. TRAINER

INVENTORS

BY Gray, Mase, and
Dunson, Attorneys

March 7, 1967  J. W. ADAM ETAL  3,307,861
COUPLING WITH A DEFORMABLE SEAL

Filed March 2, 1964  2 Sheets-Sheet 2

JAMES W. ADAM
BERNARD GOOBICH
THOMAS M. TRAINER
INVENTORS

BY Gray, Mase, and
Dunson, Attorneys

United States Patent Office 3,307,861
Patented Mar. 7, 1967

3,307,861
COUPLING WITH A DEFORMABLE SEAL
James W. Adam, Bernard Goobich, and Thomas M. Trainer, all of Columbus, Ohio, assignors, by mesne assignments, to The Battelle Development Corporation, Columbus, Ohio, a corporation of Delaware
Filed Mar. 2, 1964, Ser. No. 348,737
3 Claims. (Cl. 285—334.2)

This invention relates to a lightweight coupling for use in fluid systems that are subjected to extreme mechanical and environmental conditions. More particularly, it concerns a threaded fitting having a bobbin-shaped seal that has deflectable portions for producing improved sealing characteristics.

The development of reliable lightweight mechanical fittings for service in the fluid systems of recently developed aircraft such as rockets and missiles is extremely difficult (as compared to former aircraft) due to very low permissible leakage rate, problems of severe vibration, fluid pressure, temperature, and chemical activity that are encountered in this field. Present trends indicate that future requirements will be even more extreme such as possible operating temperatures as high as 3000° F. Attempts have been made to adapt conventional fittings for present-day use but, since most of the conventional fittings were originally designed for aircraft hydraulic systems, they are generally unsatisfactory for the more extreme environments.

In order to seal fluids at the pressures and temperature encountered in the fluid systems of rockets and missiles, where high-temperature conditions exist frequently, the sealing surfaces must almost of necessity be metallic. Furthermore, for sealing some fluids (helium for example), there must be plastic yielding at the sealing surfaces. When the coupling is positioned in the fluid system, certain structural loads will be imposed upon it, such as bending, expansion and contraction of the materials due to temperature changes, vibration, pressure, etc. Thus, some of the most important factors to consider in establishing and maintaining sealing surfaces are: (1) the forces necessary to produce plastic yielding at the sealing interface; (2) the forces necessary to overcome structural loads imposed on the coupling as it occupies its position in a fluid system; and (3) environmental changes internal and external to the coupling, such as temperature and pressure changes which tend to vary the forces acting on the sealing surfaces of the coupling.

Briefly described, this invention provides a coupling for use in a duct system containing fluids, with the coupling including a plain stub end, a threaded stub end, a bobbin-shaped seal positioned between the stub ends, a nut engaging the plain stub end and having threads engageable with the threaded stub end whereby upon rotation of the nut the stub ends are moved toward one another to compress the seal in a particular way therebetween.

One advantage of this invention is that a coupling is provided that meets the operating requirements of duct systems having widely fluctuating pressures and temperatures and is still distinctly low in weight.

Another advantage of this invention is the provision of a coupling that is easy to assemble and alleviates or eliminates the chance of human error in assembly.

Another advantage is that the seal of the coupling yields plastically when assembled and retains sufficient spring strength to maintain a seal even though the load on the seal may fluctuate.

Still another advantage of this invention is the provision of a coupling configuration whereby the axial forces resulting from tightening the coupling are magnified and transferred very efficiently to the sealing surfaces; also, the seal stores a portion of the energy developed by the axial forces to maintain a continuous force on the sealing surfaces.

Another advantage of the coupling of this invention is the provision of a coupling that produces a distinct increase in the required tightening force for the coupling after sealing has once been established, thus possibly eliminating the use of a torque wrench.

Still another advantage of this invention is that the forces of preloading that are in excess of the forces necessary for sealing are not applied to the sealing faces and yet the excess force assists in minimizing seal load fluctuations.

Still another advantage of the coupling of this invention is the provision of sealing surfaces that operate independently of one another, thus minimizing the requirement for maintaining close tolerances on the size of the coupling parts when they are manufactured.

Still another advantage of the coupling of this invention is the provision of a seal geometry that increases the elastic recovery of the seal over that available from a seal that is simply compressed or elastically deflected.

Still another advantage of this invention is that the stresses created in the fitting due to the applied sealing force can be limited at a maximum value because of the controlled yielding of the seal tang.

Still another advantage of the coupling of this invention is that provision is made to prevent rotation of the sealing surfaces after sealing has been established.

Still another advantage of the coupling is that the means for moving the sealing surfaces together is constructed so as to maintain a selected load range on the coupling parts within the elastic limits of the coupling materials.

Still other advantages will be apparent from the description and claims that follow and the drawings included herein.

Figure 1:
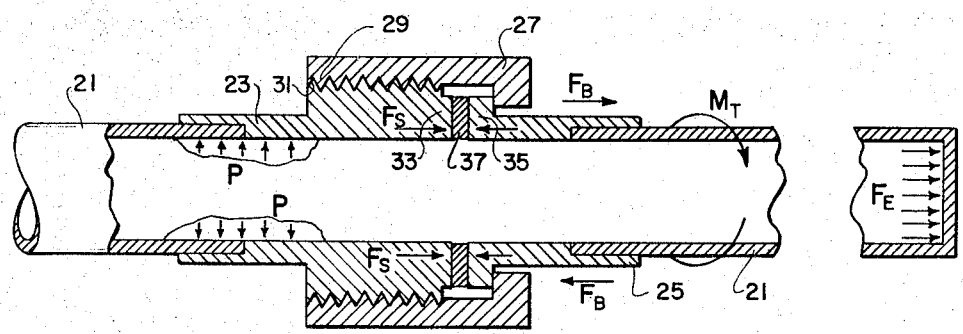
FIG. 1 is a diagram of a conventional type of coupling showing some of the various forces that act on the coupling.

In the drawings, the same reference numerals are applied to identical parts in all embodiments and such identically numbered parts are identical in structure, function, and operation. Therefore to eliminate confusing duplication, those parts, their interrelationship and their function will be described only in conjunction with a single embodiment, such description applying to all embodiments where these parts appear.

FIG. 1 is a diagram of a simplified mechanical connection (and is not a part of this invention) showing the types of loads that are imposed singly or collectively during operation on a connection that has been installed in a typical fluid system. The tubing 21 is attached to a threaded end 23 and a plain end 25. A nut 27 engages the plain end 25 and has threads 29 that engage the threads 31 on the threaded end 23. The threaded end 3 has a sealing face 33 positioned opposite a sealing face 5 on the plain end 25. A gasket or seal 37 is positioned between the sealing surfaces 33 and 35.

Included or shown in the diagram of FIG. 1 are a number of arrows that indicate various forces or loads that the fitting must withstand if it is to function successfully. The internal pressure within the tube 21 acts against the wall of the tubing and fitting in the direction shown by the arrows labeled P. The stress caused by this particular load is called the hoop stress. This load is a controlling factor in the selection of the wall thickness of the duct system or tube. Since the fitting structure almost always has a greater wall thickness than the tubing it connects, the radial force exerted by this load, P, becomes only a secondary consideration when designing the coupling structures.

Another load that arises because of pressure inside the duct system or tube is the end load. The end load is represented by the arrows labeled $F_E$ in FIG. 1. Since the end load tends to pull the fitting apart and reduce the force that was applied to the seal 37 by tightening the nut 27, it becomes an important consideration in coupling design. The end load, $F_E$, is dependent on the internal pressure and is defined by $$F_E = \frac{\pi}{4} G^2 P \qquad (1)$$

where: $F_E$=end load, lb.; $G$=effective seal diameter, inches; and $P$=internal pressure, p.s.i. Although some duct systems include anchors and clamps to absorb end loads, in general, the fitting must withstand the total end load.

A bending moment, M (not shown in FIG. 1), may produce bending loads, indicated in FIG. 1 by the arrows labeled $F_B$. Bending moments, M, may be present because of tubing misalignment, thermal expansion or contraction of the tubing system, vibrations, displacement of anchors or acceleration forces. The bending moments that are imposed on a coupling cannot be determined precisely since they will depend upon the specific tubing system. For this reason, the most logical basis for determining the probable maximum bending moments that can occur is by determining the strength of the tubing in the system and the equipment (pumps, pressure vessels, compressors, heat exchangers, etc.) to which the tubing of the system is attached. The maximum bending moment that can be applied to a coupling through the attached tubing is represented by the relation $$M = SZ \qquad (2)$$

where: $M$=the maximum bending moment, inches-lb.; $S$=the limiting stress of the tube material, p.s.i.; and $Z$=the section modulus of the tube cross section, inches³. Since both S and Z in Equation 2 depend upon the material used for the tubing wall and its thickness, the maximum bending moment, M, can be established only after the tube is selected. There are other minor factors that enter into the determination of bending moments, but the above is sufficient to point out that such forces exist and must be considered in the proper construction of a high-capacity fitting.

External axial and torsional loads arise from the same causes as bending loads. The torsional load on a fitting is indicated in FIG. 1 by the arrow encircling the fitting that is labeled $M_T$. External axial loads are usually minor and can be discounted. Basically, the torsional loads are limited to three dimensional systems of tubing and become a problem when the system is sufficiently large to cause rotation of one part of the fitting with respect to the other. Rotation could cause leakage in a threaded joint because the sealing surfaces are disturbed or rotation may cause some backing off of the threaded parts reducing the original tightness of the fitting. A torsional resistance of the fitting equal to the force which can be passed to the fitting by the tube (and limited by the strength of the tube) is the force to consider in the construction of the coupling.

Finally, the fitting must be strong enough to withstand the load required to produce sealing. This load, indicated by the arrows labeled $F_S$ in FIG. 1, must produce intimate contact between the sealing faces 33 and 35 and the gasket 37. As an example, assume that a sealing load of 1000 lbs. per linear inch of gasket circumferential length is required to seal the fluid in the system. The sealing load is given by the relation $$F_S = 1000 G \qquad (3)$$

where: $F_S$=the seal seating load, lb.; and $G$=the effective gasket diameter, inches.

An understanding of the above-discussed loads is important in order to construct a high-capacity coupling, since, in the majority of cases, these loads tend to pull the sealing surfaces of the coupling apart. Any small degree of separation of the surfaces caused by a reduction of $F_S$ generally leads to failure. "Failure" of the fitting or coupling includes the loss of ability to maintain sealing so that the coupling no longer confines the fluid of the system even though there is no apparent structural change in the coupling parts. In order to counteract the action of the loads imposed on the coupling during its service in a fluid system (the most important loads being the loads that produce axial forces and thus axial displacements), the sealing parts must be prestressed or preloaded. The sealing members of the coupling are placed in compression by an amount greater than the expected strain relaxation caused by the axial forces or service loads.

A preloaded coupling is statically indeterminate and hence must be analyzed on the basis of elastic displacement of the various structures of the coupling. Calculations of displacements become quite complex when stressing and bending of structural parts, changes in moment arms, and radial effects of internal pressure are involved. A basic understanding of the problem, however, can be obtained and used for analysis and design if the effects of moment arm changes and the radial components of internal pressure are disregarded. The factors to be considered in the analysis of a threaded fitting on the basis of elastic displacements are: (1) the minimum residual compressive load on the seal; (2) the maximum allowable stress in the tensile members; (3) the deflection rate of the compression members; (4) the deflection rate of the tensile members; (5) the magnitude of the structural loads; (6) the effects of thermal gradients; and (7) the possible preload variations.

Figure 2:
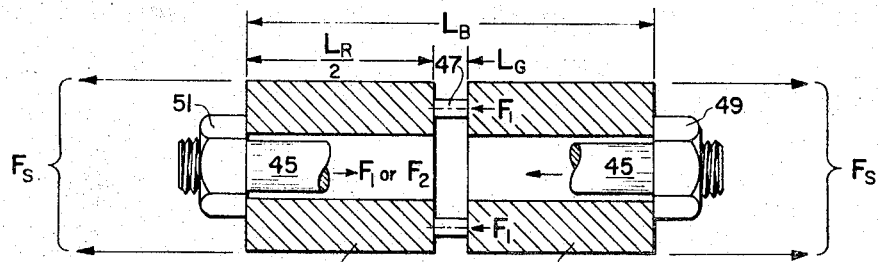
FIG. 2 is a diagram for illustrating the deflections and forces occurring in structures (similar to those of coupling) when they are compressed or stretched by tightening a nut.

Some basis for determining the proper preload required for a coupling must be established as a basis for the construction requirements of any coupling that is to function successfully in any given fluid system. FIG. 2 is a diagram of a structure which is used here to indicate some of the forces present in a coupling that are to be considered for an understanding of preload. Two thick rings 41 and 43 are positioned around a bolt 45 with a small ring 47 between them. When the nuts 49 and 51 are tightened, the large rings 41 and 43 are compressed and in turn compress the small ring 47 between them. In an actual threaded fitting, the nut of the threaded fitting is analogous to the bolt 45 of FIG. 2. The stub ends and seal of the coupling are analogous to the large rings 41 and 43 and the small ring 47, respectively, of FIG. 2. The dimensions and arrows on the diagram of FIG. 2 relate to dimensions and forces hereinafter discussed.

When the nuts 49 and 51 are tightened on the bolt 45, there is an increase in bolt length (indicated by the dimension $L_B$ in FIG. 2), a decrease in the length of the large rings 41, 43 (the length of one large ring is indicated by the dimension $L_R/2$ in FIG. 2), and a decrease in the length of the small ring 47 (the length of the small ring is indicated by dimension $L_G$ in FIG. 2). The increase in bolt length (which is the nut in an actual coupling) is determined by the relation $$\delta_B = \frac{F_1 L_B}{E_B A_B} \quad (4)$$

where $\delta_B$=the change in the length of the bolt, inches; $F_1$=the initial bolt axial force, lb. (shown in FIG. 2 by the arrow labeled $F_1$ or $F_2$); $L_B$=the free axial length of the bolt, inches; $E_B$=the modulus of elasticity of the bolt, p.s.i.; and $A_B$=the cross-sectional area of the bolt, inches².

The decrease in the length of the large rings 41, 43 (which are the stub ends in an actual coupling) and the small ring 47 (which is the seal in an actual coupling) is shown by $$\delta_R = \frac{F_1 L_R}{E_R A_R} \quad (5)$$

and $$\delta_G = \frac{F_1 L_G}{E_G A_G} \quad (6)$$

where: $\delta_R$ and $\delta_G$=the change in length of the large rings 41, 43 and the small ring 47, respectively, inches; $F_1$=the initial bolt axial force, lb.; $L$=free axial length, inches; $E$=modulus of elasticity, p.s.i.; and $A$=the cross-sectional area, inches². The subscripts R and G refer to the large rings 41, 43 and the small ring 47, respectively.

When a load (as indicated by the arrows labeled $F_S$ in FIG. 2) is applied (as from the attached tubing in an actual coupling), the force in the bolt 51 changes to $F_2$ and Equations 4, 5, and 6 become $$\delta_{B2} = \frac{F_2 L_B}{E_B A_B} \quad (7)$$

$$\delta_{R2} = (F_2 - F_S)\frac{L_R}{E_R A_R} \quad (8)$$

and $$\delta_{G2} = (F_2 - F_S)\frac{L_G}{E_G A_G} \quad (9)$$

The changes in the length of the bolt 51 must remain equal to the combined length changes of the rings 41, 43 and 47 so that $$\delta_{B2} - \delta_B = (\delta_R + \delta_G) - (\delta_{R2} + \delta_{G2}) \quad (10)$$

or by substitution, $$(F_2 - F_1)\frac{L_B}{E_B A_B} = (F_1 - F_2 + F_S)\left(\frac{L_R}{E_R A_R} + \frac{L_G}{E_G A_G}\right) \quad (11)$$

The above relation can be simplified by defining $$\frac{L_B}{E_B A_B} = R_B \text{ and } \frac{L_R}{E_R A_R} + \frac{L_G}{E_G A_G} = R_G$$

where $R_B$ is the spring constant of the bolt 51 and $R_G$ is the spring constants of the rings 41, 43 and 47. The spring constants are substituted into Equation 11 and terms collected to give $$F_2(R_B + R_G) = F_1(R_B + R_G) + F_S R_G \quad (12)$$

which may be written $$F_1 = F_2 - \frac{F_S}{+\frac{R_B}{R_G}} \quad (13)$$

If $F_2$, the maximum allowable load, and $R_B$ and $R_G$, the spring constants, can be determined or closely approximated, the analytical determination of $F_1$ the preload, is relatively simple by means of Equation 13.

Figure 3:
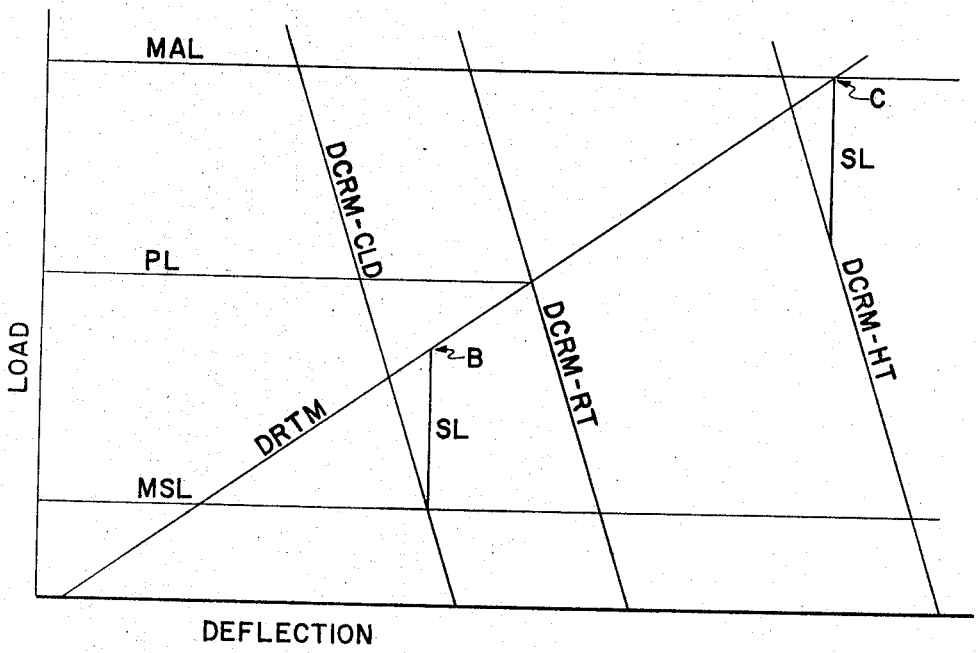
FIG. 3 is a curve or preload diagram indicating the various forces and deflections that are to be examined in the construction of the coupling of this invention.

The interrelationship of these many factors and their significance may be shown by the diagram of FIG. 3, where the load is plotted against the deflection of the various coupling members. This diagram can be used to determine various limits and thus aid in the construction of a coupling that will be within the limits of the diagram.

Referring to FIG. 3, the diagram has a number of lines that are determined and these lines in turn determine the position of other lines. The horizontal line labeled MSL (Minimum Seal Load) is a compressive load and is the minimum load which must be maintained on the sealing member under given operational conditions to satisfy a given leakage requirement. In any coupling that merely squeezes or compresses the seal (as does the coupling in FIG. 1), the minimum residual compressive or axial load needed to keep the sealing surfaces 33 and 35 seated against the gasket-type seal 37 is a seal contact stress slightly above the internal fluid pressure. For the coupling of this invention, however, once there has been sufficient load to establish sealing, the minimum compressive or axial load can theoretically be reduced to zero. However, even for this seal a residual compressive or axial load of ten percent of the expected structural loads on the coupling is selected. The line MSL is thus determined and drawn on the diagram.

The next determination to be made is the maximum allowable tensile load. This load is the load at which the highest stress occurring in the tensile member (the nut) of the coupling is equal to the maximum allowable stress of the nut material. The maximum allowable stress for the nut is based on the yield stress at the maximum operating temperatures, divided by whatever safety factor is desired for the coupling. In order to construct an efficient coupling, the maximum nut load under maximum operational load must be equal to the maximum allowable nut load. If the coupling is constructed so that the nut has a maximum allowable load that is considerably more than the maximum nut load under maximum operational load, the nut is over-designed and the coupling will be much heavier than it needs to be to perform its required function. Of course, if the maximum allowable nut load is less than the maximum nut load that can occur, the nut and coupling will be under-designed and fail. The maximum allowable nut load is drawn on the diagram of FIG. 3 as a horizontal line and is labeled MAL (Maximum Allowable Load). This line (MAL) on the preload diagram represents the maximum load which will be on the nut during any combination of operational conditions. This line (MAL) can be considered as an upper boundary condition below which the coupling structure must operate.

The total deflection rate of the compression members, i.e., the deflection in inches per unit load can be determined, as shown for example in Equations 5 and 6. In the threaded end of the flange, because of the stress distribution in the thread on the threaded end, only a portion of the threaded end is under compression. It is reasonably assumed that only 50 percent of the length of the threaded flange is under compression. The deflection rate line (or curve) for the compression members is shown by the slanted line labeled DRCM-RT (Deflection Rate Compression Member-Room Temperature).

If a cold fluid like liquid oxygen is introduced into a piping system, the temperatures of the parts in direct contact with the fluid will decrease rapidly. The temperatures of those parts not in direct contact will change less rapidly. During such a transient period the compression members of the coupling are at a lower average temperature than the tensile members. During this time, the effective preload decreases because, in effect, the nut is expanding (actually the compressive members shrink due to the temperature change) and there is a possibility of seal surface separation that could cause leakage. Similarly, when a hot fluid is introduced into the piping system the compression members become hotter than the tensile members. This increases the preload since the compression members expand and load up the tensile members or nut. If the nut yields or stretches permanently, when the temperature is later equalized the preid could become partially or completely removed with consequent leakage.

The temperature difference is a function of the fluid properties and flow velocity as well as the fitting material and dimensions. Hence, the numerical value for this temperature difference can be calculated for a specific coupling. Knowing the maximum average temperature differences, based on the given operational conditions of the system, it is possible to calculate the expansion or contraction of the compression members. The deflection resulting from the thermal gradient is then represented on the preload diagram as a displacement of the deflection rate of the compression members (DCRM-RT) and the hot and cold displacements are represented on the preload diagram of FIG. 3 by the lines labeled DCRM-HT and DCRM-CLD, respectively.

The next factor to be taken into account and added to the preload diagram of FIG. 3 is the structural loads. The magnitude of the structural loads is dependent on the internal pressure and the external loads imposed by the tubing system, including the axial, torsional, and bending-type loads (discussed previously herein). The structural load is represented as a vertical line (labeled SL) on the preload diagram of FIG. 3. The upper end of the structural load line (SL) represents the load which is on the tensile member or nut of the coupling. Similarly, the lower end of the SL line represents the load which is on the compression members of the coupling. The maximum load will be imposed on the nut when both the structural load and the hot thermal gradient are applied to the fitting. This results in the placement of the structural load line so that it fits between the maximum allowable tensile load line (MAL) and the line (DRCM-HT) that represents the deflection rate of the compression members under hot thermal transient conditions. Thus, as shown in FIG. 3, the SL line is fitted in a vertical position between the MAL line and the DRCM-HT line. At the other extreme, the load on the compression members must never be reduced below the previously established minimum residual seal load (represented by the MSL line in FIG. 3). The minimum load on the nut will occur when both the structural load and the cold thermal gradient are applied to the coupling at the same time. This results in a second placement of the SL line, as shown in FIG. 3, vertically upward from the intersection of the minimum residual seal load line (MSL) and the line (DRCM-CLD) that represents the deflection rate of the compression members under cold thermal transient conditions.

Note now the upper ends of the two SL lines of FIG. 3 which are labeled B and C. The line (labeled DRTM) drawn through these two points represents the desired deflection rate of the tensile members or nut. This is the deflection rate which the nut must have in order to satisfy the following requirements: (1) the maximum operational nut load being equal to the maximum allowable tensile load; (2) the proper hot thermal gradient capability; (3) the proper cold thermal gradient capability; and (4) the minimum load on the compression members being equal to the established minimum residual seal load.

Finally the intersection of the line (DRTM) representing the desired deflection rate of the tensile members with the line (DCRM-RT) representing the deflection rate of the compression members at room temperature gives the desired value of the initial preload (represented by the line labeled PL) to be applied to the fitting, as shown in FIG. 3. This load must be larger or at least equal to the load required to seat the sealing parts, i.e., establishing sealing, or the coupling will not function properly. Since the selection of the dimensions for the compression members would dictate a particular type of tensile member and vice versa, large numbers of calculations may be required to determine the construction required for the optimum coupling. For use in the aircraft field, the coupling must be of minimum weight. The dimensions for the optimum coupling are therefore best determined by using the above information with a computor.

Figures 4, 5:
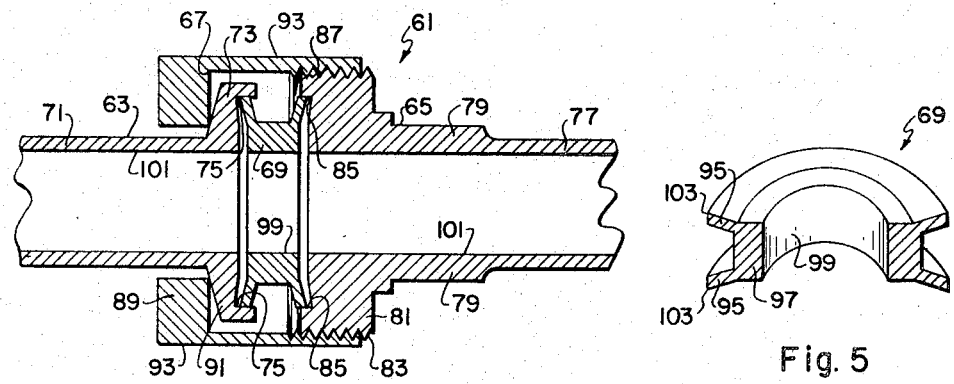
FIG. 4 is a cross section of a coupling according to the invention showing the position of various parts before the coupling is tightened.
FIG. 5 is a perspective view of half of the seal used in a coupling shown in FIGS. 4 and 6.
Figure 6:
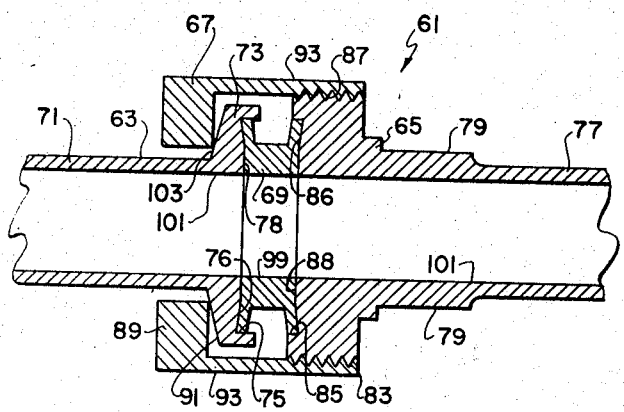
FIG. 6 is a cross section of the coupling shown in FIG. 4 after it has been tightened.
Figure 7:
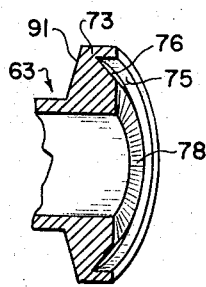
FIG. 7 is a perspective view of a plain stub end as it would appear if cut in half.

The foregoing analysis serves as a basis for determining the requirements for a coupling after its geometry has been established. The preferred geometry of the coupling of this invention is shown in FIGS. 4, 5, 6, and 7. FIG. 4 is a cross section of the coupling 61 after it is assembled but before it is tightened. FIG. 5 shows the seal 69 that is used in the coupling as it would appear if it were cut in half. FIG. 6 is a cross section of the coupling 61 after it has been tightened and is ready for service in a duct system. FIG. 7 is a perspective view of a stub end as it would appear if it were cut in half. In general, the coupling 61 includes a plain stub end 63, a threaded stub end 65, a nut 67, and a seal 69 (often referred to as a bobbin seal because of its shape).

The plain stub end has a tube 71 that is sized to match the diameter of the tube (not shown) of the duct system into which the coupling 61 will be placed. The tube 71 is attached (preferably welded) to the tube of the duct system. The plain stub end 63 is provided with a hub 73 having sealing surfaces or a seat 75. A secondary sealing surface 76 is also provided and, in the preferred embodiment, is inclined to match the profile of the compressed seal 69 (as the seal 69 is shown in FIG. 6). A knurled surface 78 (best shown in FIG. 7) is provided interior to the secondary sealing surface 76.

The threaded stub end 65 has a tube 77 that also is attachable to the tube of the duct system. Wrench flats 79—79 are provided between the tube 77 and a hub 81. The hub 81 is provided with threads 83 and also has a sealing surface 85, secondary sealing surface 86, and a knurled surface 88.

The nut 67 is fitted over the plain stub end 63 and is provided with internal threads 87 that engage the threads 83 on the threaded stub end 65. The nut 67 has a flange 89 that engages the outer surface 91 of the plain stub end 63 (preferably, the surface 91 is inclined or tapered slightly). The nut 67 is provided with wrench flats 93—93. By positioning wrenches on wrench flats 79—79 and 93—93, and rotating the nut 67, the stub ends 63 and 65 are drawn toward one another.

FIG. 5 shows a perspective view of half of the seal 69 (as it would appear if sawed in half). The seal has a pair of flanges or legs 95—95 and a tang 97. The inner surface 99 of the seal 69 has a selected diameter which, at the time of original assembly of the coupling (before tightening as shown in FIG. 4), is slightly larger than the diameter of the central opening 101 of the stub ends 63 and 65. After the coupling 61 has been tightened (FIG. 6), the diameter of the inner surface 99 has been reduced to closely approximate the diameter of the central opening 101 (this effect has been exaggerated in the drawings so as to be noticeable).

A more complete understanding of the coupling 61 and its advantages is obtained by noting the various changes that occur as the coupling 61 is tightened. The coupling 61 has primary sealing surfaces (75 and 85) located on a cylindrical plane with its axis coincident with the coupling axis and secondary sealing surfaces 76 and 86 at an angle with the coupling axis so that the force bringing the stub ends 63 and 65 together is magnified and applied to the sealing surfaces. When the stub ends 63 and 65 move toward one another, surfaces 76 and 86 contact the seal legs 95—95 at their edges 103—103 and cause the seal legs 95—95 to be deformed toward each other. The seal legs 95—95 also become diametrically larger and contact the sealing surfaces 75 and 85 to begin the sealing condition. As the stub ends 63 and 65 continue to move toward each other, the seal legs 95—95, tend to become more perpendicular to the axis of the coupling 61 and an interference fit is created between the diameter of the seal legs 95—95 and the stub end sealing surfaces 75 and 85. It is particularly important to note that the seal legs 95—95 yield independently of one another, i.e., one leg can deflect faster or slower than the other. This advantage is due to the fact that the legs 95—95 are attached at separate points on the tang 97 so that the material that yields when one leg 95 deflects is not common to the material that yields when the other leg 95 deflects. The seal contact stress is in excess of the apparent compressive yield strength of the seal material by as much as two times, and plastic yielding and deformation is developed at the interface between the seal legs 95—95 and the stub end sealing surfaces 75 and 85. If the seal 69 is fabricated from a material whose apparent compressive yield strength is too high to facilitate plastic deformation, a soft metallic or nonmetallic coating is used to plate or coat the seal. Since the ends of the seal legs 95—95 are confined by the sealing surfaces 75 and 85, they tend to exert ever-increasing pressure on the tang 97. After the elastic limit of the seal material is exceeded, the pressure of the radial force causes the tang 97 to yield and the diameter of the inner surface 99 to be reduced. The tang 97 may yield almost as soon as tightening of the nut 67 is started, or the tank 97 may yield much later depending on the matching tolerances of the surfaces of the stub ends 63 and 65 and the surfaces of the seal 69. In any event it is the stresses resulting from the reduction in size of the tang 97 are responsible for maintaining the sealing force that keeps the legs 95—95 in intimate contact with the sealing surfaces 75 and 85. The cross section of the tang 97 is specifically determined to match the construction of the seal legs 95—95 so that when the tang 97 yields or reduces in diameter, the material present in the tang 97 supplies the proper amount of force to establish and maintain sealing. Furthermore, as the stub ends 63 and 65 move closer together and contact the seal tang 97, the knurled surfaces 78 and 88 "bite" into the sides of the tang 97. The provision of the knurled surfaces 78 and 88 aids in resisting the frictional rotational drag developed where the corner 103 of the nut 67 contacts surface 91 of the plain stub end 63. The relative movement between the stub ends 63 and 65 and seal 69 is prevented after the seal 69 is seated. The prevention of relative movement between the sealing parts after they are seated also prevents displacement of the metal surfaces that are active in sealing. Displacement of the sealing surfaces could cause leakage. Further application of the force developed by rotating the nut 67 after the stub ends 63 and 65 contact the seal tang 69 causes the preload force to rise rapidly to the desired and required value.

In general, attachment means (sub ends 63 and 65) are provided for connection to a duct system. The attachment means include an inner cylindrical surface (sealing surfaces 75 and 85) having its axis coinciding with the axis of the duct system. A seal 69 is positioned inside the cylindrical surface and the periphery of the seal can be increased in diameter (seal legs 95—95) to contact the inner cylindrical surface to establish sealing. The periphery of the seal is expanded by tightening means (nut 67) that moves the attachment means toward one another and the attachment means have contact surfaces (76 and 88) that aid in expanding the diameter of the seal. Expansion of the diameter of the seal builds up radial forces in the seal that maintain the sealing surfaces in contact. Two separate sets of sealing surfaces are present and seal independently of one another. The force applied to the sealing surfaces is limited and maintained by means (tang 97) on the seal. The axial force used to bring the sealing surfaces against one another is rapidly increased by stop means (tang 97) on the seal 69. Frictional means (knurled surface 78) are provided to prevent relative rotation of the sealing surfaces.

The seal 69 may be reversed in configuration so that the legs 95—95 extend inwardly and the sealing surfaces thereon reduce in diameter. The tang 97 is then positioned on the outer periphery of the seal and is expanded outwardly to provide the sealing force. The surfaces 75, 76, 78, 85, 86, and 88 if the stub ends 63 and 65 are also reversed to match the contours of the "reversed" bobbin seal. The difference between the bobbin-seal and reversed bobbin-seal is the relationship between tang diameter and the diameter of the sealing surfaces of the legs. At least relatively speaking more force (for sealing) results from changing the diameter of the smaller ring (tang) than the larger ring (tang.) The bobbin-shaped seal is therefore usually preferred over the reversed bobbin seal.

The various mathematical concepts developed previously herein can be applied to the coupling 61 shown in FIGS. 4–7. The nut 67 is the tension member and the seal 69 and stub ends 63 and 65 are the compression members. Thus, after the determination of the preload force ($F_1$, lbs.), the maximum load ($F_S$, lbs.) that will be imposed by the duct system, and the force ($F_i$, lbs.) that exists at the sealing surface, the coupling is constructed so that the spring constant of the nut 67 ($R_B$, in./lb.) and the spring constants of the seal 69 and stub ends 63 and 65 ($R_G$, in./lb.) satisfy the equation $$F_1 = F_i + \frac{\frac{R_B}{R_G}}{1 + \frac{R_B}{R_G}} F_S$$

Although a number of couplings may be useable to meet the force requirements of the equation, the optimum coupling has adequate sealing capabilities and minimum weight.

It will be understood of course, that, while the forms of the invention herein shown and described constitute preferred embodiments of the invention, it is not intended to illustrate all of the possible equivalent forms or ramifications of the invention. It will also be understood that the words used are words of description rather than of limitation, and that various changes, such as changes in shape, relative size, and arrangement of parts may be substituted without departing from the spirit or scope of the invention herein described.

What is claimed is:
1. A coupling for connecting the adjacent open ends of a duct system, comprising:
   (a) a first coupling end and a second coupling end each connectable to an open end of the duct system;
   (b) a primary cylindrical sealing surface on each said first and second coupling ends with the central axis of said primary cylindrical sealing surface substantially coinciding with the axis of said duct system, a secondary sealing surface in the form of a truncated cone, having its central axis substantially coinciding with the central axis of said duct system, connected to each said primary cylindrical sealing surface, said primary cylindrical sealing surface and said secondary sealing surface partially facing one another and forming an acute angle with one another, and an annular surface adjacent to each said secondary sealing surface, said annular surface lying substantially in a plane perpendicular to the central axis of said duct system;
   (c) threaded means connected to said first and second coupling ends whereby rotation of said threaded means causes movement of said first and second coupling ends toward one another;
   (d) a seal positioned between said first and second coupling ends, said seal including an annular-shaped tang and two flanges extending from the sides of said annular-shaped tang, the free edge of each said two flanges substantially mating with a primary cylindrical sealing surface and the outer side surface of each said two flanges substantially mating with a secondary sealing surface, whereby upon movement of said first and second coupling ends toward one another said two flanges first contact said secondary sealing surfaces, said secondary sealing sur- faces moving said flanges until the free edges of said two flanges contact said primary cylindrical sealing surfaces thereby establishing a seal by plastic deformation of the sealing surfaces of said free edges of the said flanges and upon continued movement of said first and second coupling ends toward one another the constraining effect of said primary cylindrical sealing surfaces exerts a force upon said tang through said flanges producing elastic yielding in said tang and changing the diameter thereof thereby producing a force to maintain a seal and upon further movement of said first and second coupling ends toward one another said annular surfaces on said first and second coupling ends contact said tang to prevent further movement of said coupling ends.

2. A coupling for connecting the adjacent open ends of a duct system according to claim 1 wherein said annular surfaces on said first and second coupling ends are knurled thereby preventing rotation of said seal after said annular surfaces contact said tang.

3. A coupling for connecting the adjacent open ends of a duct system, comprising:
(a) a first coupling end connected to an open end of the duct system;
(b) a second coupling end connected to an open end of the duct system and positioned in line with and opposite said first coupling end;
(c) an internal cylindrical sealing surface on each said first coupling end and said second coupling end, each said internal cylindrical sealing surface having its central axis substantially coinciding with the axis of the duct system;
(d) a truncated conical surface adjacent to said internal cylindrical sealing surface on each said coupling end;
(e) a bottoming surface adjacent to said conical surface on each said coupling end, said bottoming surface positioned in a plane substantially perpendicular to the central axis of said internal cylindrical sealing surface;
(f) means connected between said coupling ends for moving said coupling ends toward one another; and
(g) a bobbin-shaped seal having a central ring-shaped tang and a flange extending outwardly from each side of the tang in the shape of a truncated cone and having a sealing surface on the periphery of each said flange, said seal being positioned between said coupling ends and upon movement of said coupling ends toward one another said flanges first engage said truncated conical surfaces of said coupling ends and are deflected to a position where the peripheral sealing surfaces of said flanges engage said internal cylindrical sealing surfaces of said coupling ends, said ring-shaped tang having a greater thickness than said flanges and said flange attachments to said tang being spaced from one another thereby deflecting independently of one another, said conical surfaces of said seal and coupling ends contacting one another during movement of said coupling ends whereby said conical surfaces of said coupling constrain said flanges establishing a partial seal and preventing buckling of said flanges, and upon continued movement of said coupling ends said bottoming surfaces of said coupling ends contact said tang thereby abruptly increasing the force required to move said coupling ends toward one another.

References Cited by the Examiner

UNITED STATES PATENTS

| | | | |
|---|---|---|---|
| 1,512,298 | 10/1924 | Mueller | 285—330 X |
| 1,866,160 | 7/1932 | Griswold | 285—364 |
| 2,162,184 | 6/1939 | Snyder | 285—341 X |
| 2,582,746 | 1/1952 | Champion | 285—334.4 |
| 2,863,679 | 12/1958 | Dunbar | 285—336 |

CARL W. TOMLIN, *Primary Examiner.*

D. W. AROLA, *Assistant Examiner.*